United States Patent [19]
Chen et al.

[11] Patent Number: 5,517,964
[45] Date of Patent: May 21, 1996

[54] METHOD OF CONTROLLING IDLE SPEED FOR AN INTERNAL COMBUSTION ENGINE

[75] Inventors: Gang Chen, Madison Heights; Terry R. Gutermuth, St. Clair Shores; Michael T. Vincent, Novi, all of Mich.

[73] Assignee: Chrysler Corporation, Auburn Hills, Mich.

[21] Appl. No.: 238,098

[22] Filed: May 4, 1994

[51] Int. Cl.⁶ .............................. F02D 41/16; F02P 5/15
[52] U.S. Cl. ........................................................ 123/339.11
[58] Field of Search ......................... 123/339.11, 339.21, 123/418

[56] References Cited

U.S. PATENT DOCUMENTS

| | | | |
|---|---|---|---|
| 4,328,775 | 5/1982 | Ironside | 123/339.11 |
| 5,113,827 | 5/1992 | Vincent | 123/417 |
| 5,235,946 | 8/1993 | Fodale et al. | 123/339 |

FOREIGN PATENT DOCUMENTS 4-209947  7/1992  Japan ................................... 123/339

*Primary Examiner*—Tony M. Argenbright
*Attorney, Agent, or Firm*—Mark P. Calcaterra

[57] ABSTRACT

A method of controlling idle speed of an internal combustion engine in an automotive vehicle is provided. The method includes the steps of calculating an acceleration error of the engine and determining whether the calculated acceleration error is greater than a predetermined deadband. The method also includes the steps of opening or closing an Automatic Idle Speed (AIS) stepper motor if the acceleration error is greater than the predetermined deadband and increasing or decreasing a spark advance if the acceleration error is not greater than the predetermined deadband.

18 Claims, 3 Drawing Sheets

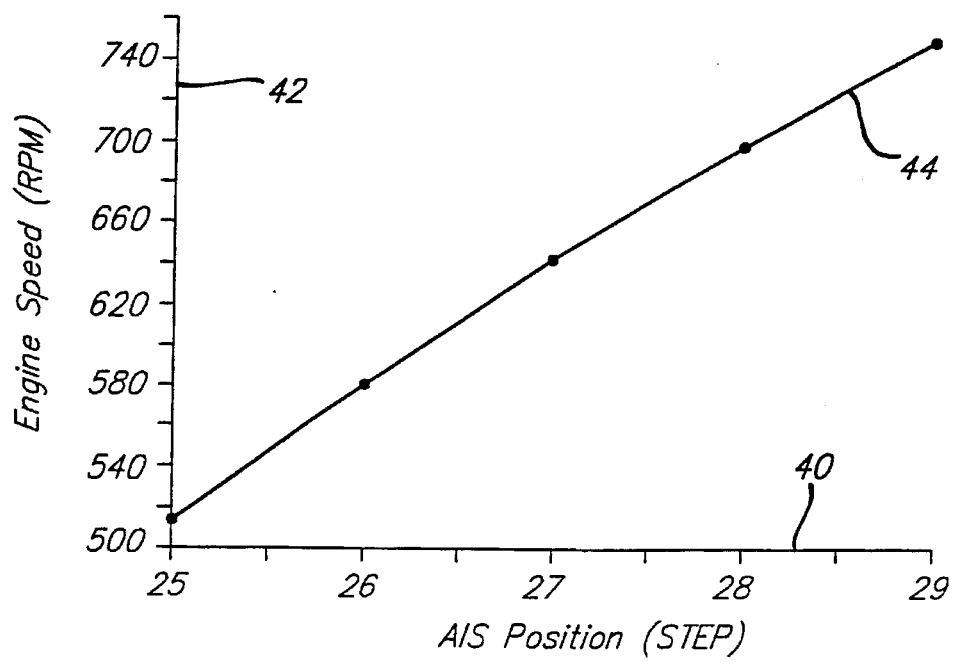
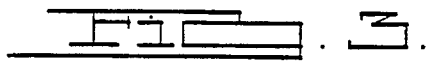
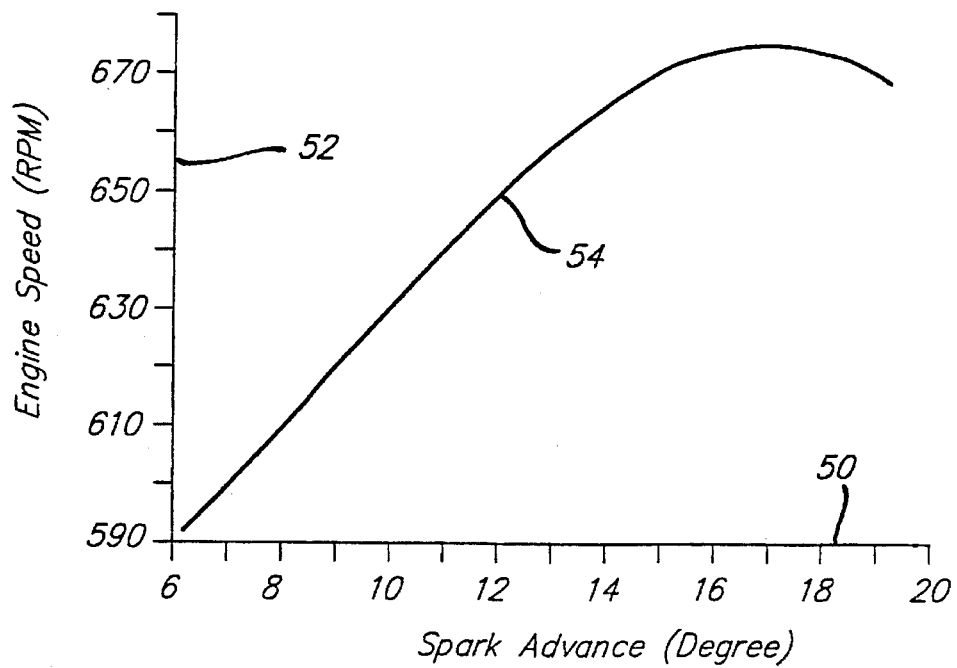
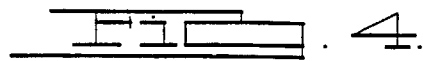

METHOD OF CONTROLLING IDLE SPEED FOR AN INTERNAL COMBUSTION ENGINE

BACKGROUND OF THE INVENTION

1. Field of the Invention

The present invention relates generally to internal combustion engines for automotive vehicles and, more particularly, to a method of controlling idle speed for an internal combustion engine in an automotive vehicle.

2. Description of the Related Art

Controlling idle speed of an internal combustion engine in an automotive vehicle poses some very common problems which include limiting idle roughness, controlling vibration, and controlling long-term small oscillations in the idle speed. These common problems have been a challenge in the automotive vehicle for a long time. To overcome these common problems, the engine has been provided with an idle speed control system. A typical idle speed control system or Automatic Idle Speed (AIS) control system uses a feedback method through an AIS stepper motor to maintain a consistent idle speed for the engine.

Because of resolution limits and delay effects (such as plenum filling, stroke and fuel flow delay, etc.), the AIS control system only provides a "coarse" adjustment in the control of the idle speed for the engine. During idle of the engine, the natural idle speed (i.e., idle speed without spark stabilization) is usually away from a targeted idle speed. When the AIS stepper motor moves, it can contribute to long-term oscillation in the idle speed and, combined with spark stabilization, may deteriorate the idle speed control quality of the engine if there is too much spark change.

SUMMARY OF THE INVENTION

It is, therefore, one object of the present invention to provide a method of controlling idle speed for an internal combustion engine in an automotive vehicle.

It is another object of the present invention to provide a method of controlling idle speed with fine adjustment of nominal spark offset.

To achieve the foregoing objects, the present invention is a method of controlling idle speed of an internal combustion engine in an automotive vehicle including the steps of calculating an acceleration error of the engine and determining whether the calculated acceleration error is greater than a predetermined deadband. The method also includes the steps of opening or closing an Automatic Idle Speed (AIS) stepper motor if the acceleration error is greater than the predetermined deadband and increasing or decreasing a spark advance if the acceleration error is not greater than the predetermined deadband.

One advantage of the present invention is that a method of controlling idle speed of an internal combustion engine in an automotive vehicle is provided. Another advantage of the present invention is that the method reduces movement of the AIS stepper motor for the AIS control system. Yet another advantage of the present invention is that the method implements a small nominal spark advance that will be performed to make a fine adjustment in the natural idle speed for the engine. Still another advantage of the present invention is that this nominal spark advance will provide the AIS control system with the ability to maintain the natural idle speed at the targeted idle speed with fewer AIS stepper motor movements. A further advantage of the present invention is that the method provides a reduced RPM error which will keep the AIS control system quiet, smooth out the spark stabilization fluctuation, and provide an increased idle speed control quality.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 3 is a graph illustrating a relationship between engine speed and AIS position of the idle speed control system of FIG. 1.

FIG. 4 is a graph illustrating a relationship between engine speed and spark advance for the internal combustion engine of FIG. 1.

DESCRIPTION OF THE PREFERRED EMBODIMENT(S)

Figure 1:
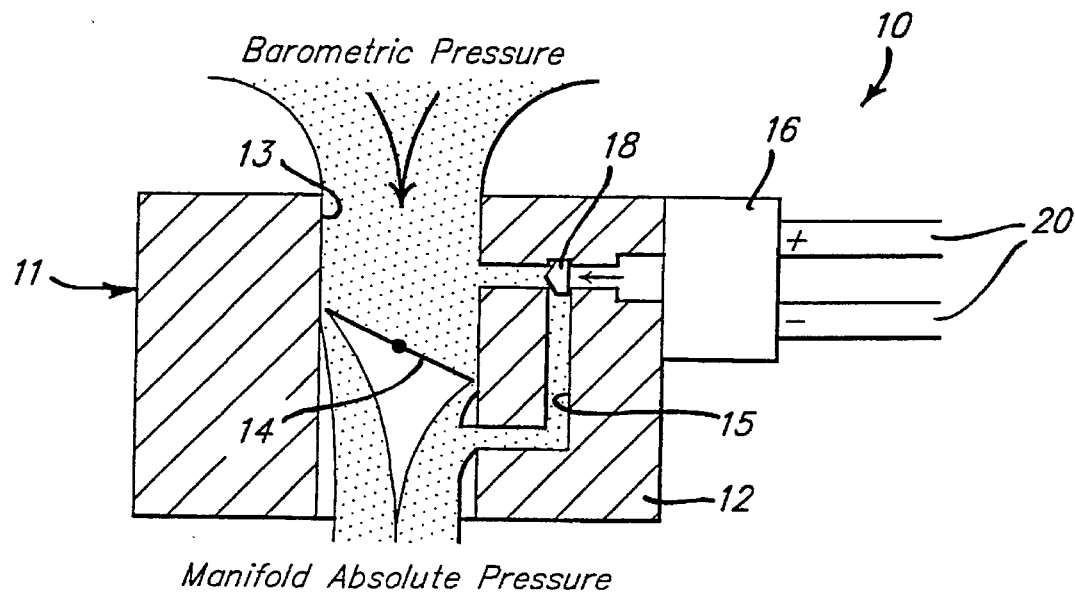
FIG. 1 is a schematic view of an idle speed control system illustrated in operational relationship with an internal combustion engine.

Referring to FIG. 1, an Automatic Idle Speed (AIS) control system 10 is shown for controlling an idle speed condition of an internal combustion engine, generally indicated at 11 and partially illustrated. The engine 11 includes a throttle body 12 having a throttle passage 13. The engine 11 also includes a throttle plate 14 disposed in the throttle passage 13 and pivotally attached to the throttle body 12. The engine 11 further includes a bypass passage 15 in the throttle body 12 which communicates with the throttle passage 13 above and below the throttle plate 14 to allow an amount of air to bypass the throttle plate 14 when the engine 11 is in an idle condition. It should be appreciated that the engine 11 is conventional and known in the art.

The AIS control system 10 includes an AIS stepper motor 16 having a bypass valve 18 which controls opening and closing of the bypass passage 15. The AIS stepper motor 16 has inputs from an electronic controller (not shown) via control lines 20. The AIS stepper motor 16 responds to input from the controller across the control lines 20 to move the bypass valve 18 to control the airflow through the bypass passage 15. It should be appreciated that the AIS stepper motor 16 makes adjustments to control the airflow through the bypass passage 15 to compensate for the fluctuations of engine speed and load changes to provide a consistent idle speed. It should also be appreciated that the resolution provided by the AIS stepper motor 16 is limited by the individual steps of the motor and provides only a coarse idle speed adjustment. It should further be appreciated that the AIS control system is conventional and known in the art.

Figure 2:
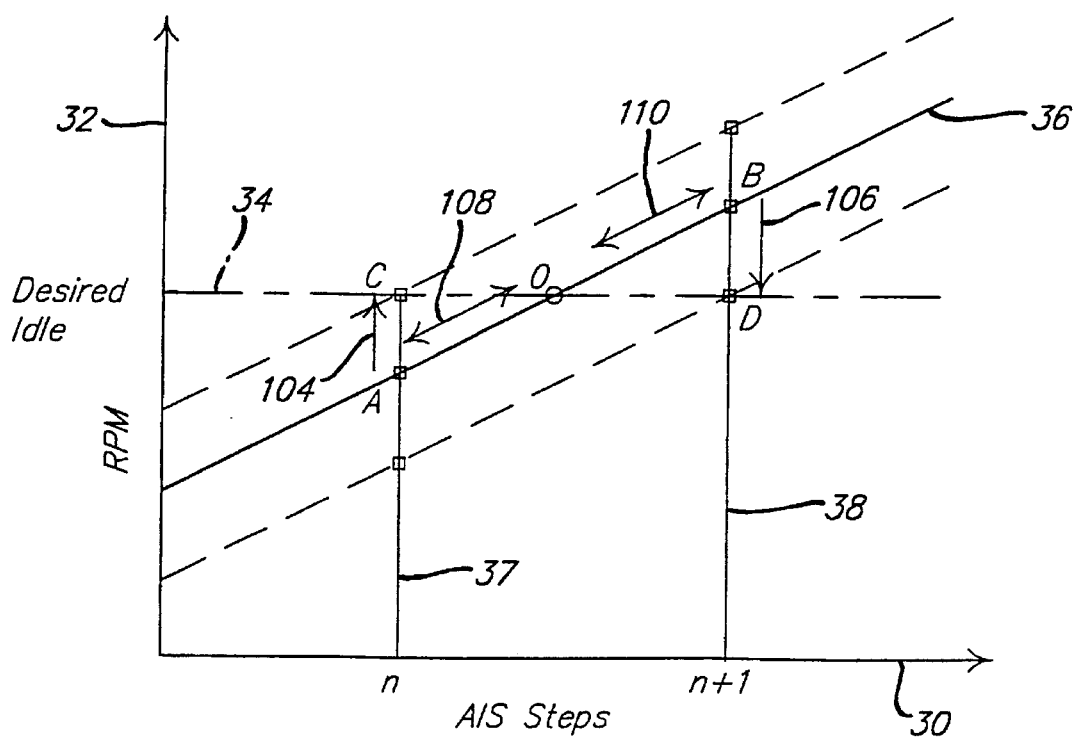
FIG. 2 is a graph illustrating a relationship between engine speed and AIS steps of the idle speed control system of FIG. 1.

Referring to FIG. 2, a graph of engine speed (RPM) versus AIS steps of the AIS stepper motor 16 is shown. A horizontal axis 30 represents the steps of the AIS stepper motor 16. The vertical axis 32 represents the RPM of the engine 11. A horizontal line 34 represents a desired or targeted idle speed. A diagonal line 36 represents a natural idle speed without spark stabilization. Since the targeted idle speed 34 is between two AIS steps 37 and 38, represented as vertical line n and vertical line n+1, respectively, the natural idle speed 36 is not equal to the targeted idle speed 34. The natural idle speed 36 is either at point A or point B, each of which is offset from the targeted idle speed 34. The targeted idle speed 34 for point A would be at point C and the targeted idle speed 34 for point B would be at point D. Since the idle speed depends on feedback error from the calculated engine speed, spark stabilization vanishes as soon as the natural idle speed 36 closes on the targeted idle speed 34 at point O. Therefore, no matter how well spark stabilization is calibrated, the natural idle speed 36 will not stay at the targeted idle speed 34. It should be appreciated that because the AIS control system 10 is a dynamic equilibrium rather than a static equilibrium, a frequent variation of the spark advance may cause idle speed roughness and vibration.

Referring to FIG. 3, a graph illustrates a relationship between the engine speed (RPM) and AIS position or Step of the AIS stepper motor 16. The horizontal axis 40 represents the individual steps of the AIS stepper motor 16. The vertical axis 42 represents the engine speed (RPM) of the engine 11. The sloping line 44 represents the change in engine speed with the steps of the AIS stepper motor 16. It should be appreciated that the throttle plate 14 is closed and the spark advance for the engine 11 is fixed.

Referring to FIG. 4, a graph illustrates a relationship between the engine speed (RPM) and spark advance (Degree). The horizontal axis 50 represents the spark advance in degrees. The vertical axis 52 represents the engine speed (RPM) of the engine 11. The sloping line 54 represents the change in engine speed with the spark advance. It should be appreciated that the throttle plate 14 is closed and the AIS position of the AIS stepper motor 16 is fixed.

Figure 5:
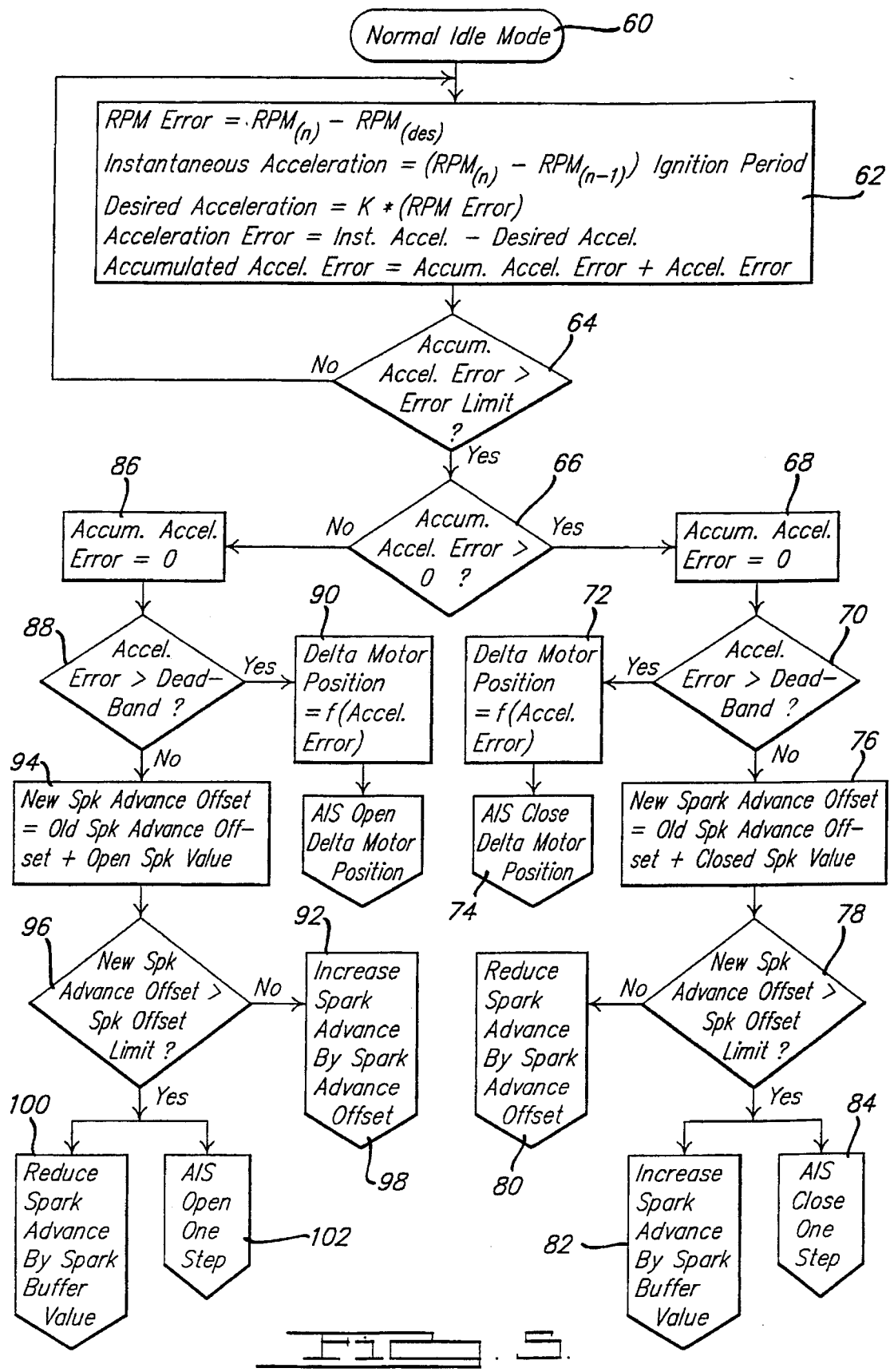
FIG. 5 is a flowchart of a method of controlling idle speed, according to the present invention, for the idle speed control system and internal combustion engine of FIG. 1.

Referring to FIG. 5, a flowchart of a method of controlling idle speed, according to the present invention, for the engine 11 is illustrated. The routine or methodology begins in bubble 60 and advances to block 62. In block 62, the methodology calculates RPM error, instantaneous acceleration, desired acceleration, acceleration error, and accumulated acceleration error. The RPM error is equal to the actual engine idle speed RPM (n) minus a desired or targeted engine idle speed RPM (des). The instantaneous acceleration is equal to the RPM (n) minus RPM(n−1) or the change in RPM over the ignition period of the engine 11. The desired acceleration is equal to K times the RPM error where K is a constant. The acceleration error is equal to the instantaneous acceleration minus the desired acceleration. Finally, the accumulated acceleration error is equal to the accumulated acceleration error plus the acceleration error. The acceleration error is accumulated every main loop of the controller.

After block 62, the methodology advances to diamond 64 and determines if the accumulated acceleration error is greater than a predetermined error limit. If so, the methodology advances to diamond 66 to be described. If not, the methodology returns to block 62 to repeat the calculations.

In diamond 66, the methodology determines if the acceleration error is greater than a predetermined value such as zero (0). If so, the methodology calculates a desired AIS stepper motor 16 close step. If the accumulated acceleration error is greater than zero, the methodology advances to block 68 and sets the accumulated acceleration error to zero (0). The methodology advances to diamond 70 and determines whether the acceleration error is greater than a predetermined deadband. The predetermined deadband are values that are calculated as a function of the resolution of the AIS stepper motor 16. The predetermined deadband is set to prevent unnecessary movement of the AIS stepper motor 16 when the RPM error is near the limited RPM resolution provided by the AIS stepper motor 16. In diamond 70, if the acceleration error is greater than the predetermined deadband, the methodology advances to block 72 and sets a delta motor position equal to a function of the acceleration error. The methodology then advances to block 74 and closes the AIS stepper motor 16 by delta motor position. It should be appreciated that, if the delta motor position is great enough, the AIS stepper motor 16 may have to close more than one step position.

In diamond 70, if the acceleration error is not greater than the predetermined deadband, the methodology advances to block 76 and calculates a new spark advance offset which is a small offset to the base spark advance. The new spark advance offset is equal to the previous old spark advance offset plus a predetermined closed spark value. The methodology then advances to diamond 78 and determines whether the new spark advance offset is greater than a predetermined spark offset limit. The spark offset limit is a calculated value that is a function of the movement of the AIS stepper motor 16 and determines if the needed correction to the spark advance is small enough to be accomplished without movement of the AIS stepper motor 16. If the new spark advance offset is not greater than the spark offset limit, the methodology advances to block 80 and reduces the spark advance by spark advance offset. It should be appreciated that the spark advance offset provides a smaller adjustment to engine speed at idle than an adjustment of the AIS stepper motor 16 and, therefore, is not possible without the spark offset feature.

In diamond 78, if new spark advance offset is greater than the spark offset limit, the methodology advances to block 82 and block 84. In block 82, the methodology increases the spark advance by a predetermined spark buffer value such as 0.5 degrees. In block 84, the methodology closes the AIS stepper motor 16 one step. It should be appreciated that the combination of block 82 and block 84 allows for an idle correction that is greater than the maximum fine adjustment by providing one step advance of the AIS stepper motor 16 without abandoning the calculated fine adjustment.

In diamond 66, if the accumulated acceleration error is not greater than zero (0), the methodology advances to block 86. In block 86, the methodology calculates a desired AIS stepper motor 16 open step and sets the accumulated acceleration error equal to predetermined value such as zero (0). The methodology then advances to diamond 88 and determines whether the acceleration error is greater than a predetermined deadband. If so, the methodology advances to block 90 and sets the delta motor position equal to a function of the acceleration error. The methodology then advances to block 92 and opens the AIS stepper motor 16 the delta motor position.

In diamond 88, if the acceleration error is not greater than the predetermined deadband, the methodology advances to block 94 and calculates a new spark advance offset new spark advance offset. The new spark advance offset is equal to the previous spark advance offset old spark advance offset plus a predetermined open spark value. The methodology then advances to diamond 96 and determines whether the new spark advance offset is greater than spark offset limit. If the new spark advance offset is not greater than the spark offset limit, the methodology advances to block 98 and increases the spark advance by spark advance offset. If not, the methodology advances to block 100 and block 102. In block 100, the methodology reduces the spark advance by the predetermined spark buffer value. In block 102, the methodology opens the AIS stepper motor 16 one step.

Referring to FIG. 2, the arrow 104 represents the offset added to the nominal spark advance by the method of FIG. 5. The arrow 106 represents the offset subtracted from the nominal spark advance by the method of FIG. 5. The arrows 108 and 110 represent the deceleration error spark stabilization and acceleration error spark stabilization, respectively.

Accordingly, the method provides a nominal idle spark advance within a deadband which functions as a "fine" adjustment to idle speed where AIS stepper motor 16 controls too "coarse" to provide a consistent stability. The final match between the natural and the targeted idle speed will smooth out the fluctuation of the spark timing and significantly improve the idle quality.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of controlling idle speed of an internal combustion engine in an automotive vehicle, said method comprising the steps of:

calculating an acceleration error of the engine;

determining whether the calculated acceleration error is greater than a predetermined deadband;

opening or closing an Automatic Idle Speed (AIS) stepper motor if the acceleration error is greater than the predetermined deadband; and increasing or decreasing a spark advance of the engine if the acceleration error is not greater than the predetermined deadband.

2. A method as set forth in claim 1 wherein said step of calculating comprises:

calculating a RPM error equal to the sensed engine speed minus a desired engine speed;

calculating an instantaneous acceleration equal to a change in sensed engine speed over an ignition period of the engine;

calculating a desired acceleration equal to a constant (K) times the calculated RPM error; and calculating an acceleration error equal to the calculated instantaneous acceleration minus the calculated desired acceleration.

3. A method as set forth in claim 2 including the step of calculating an accumulated acceleration error equal to a previous accumulated acceleration error plus the calculated acceleration error.

4. A method as set forth in claim 3 including the step of determining if the accumulated acceleration error is greater than a predetermined error limit, and if not, repeating said step of calculating RPM error, instantaneous acceleration, desired acceleration, acceleration error, and accumulated acceleration error.

5. A method as set forth in claim 3 including the step of determining whether the calculated acceleration error is greater than zero.

6. A method as set forth in claim 5 including the step of clearing the accumulated acceleration error, and if the acceleration error is greater than the predetermined deadband, setting the delta motor position equal to a function of the acceleration error and closing the AIS stepper motor said delta motor position.

7. A method as set forth in claim 5 including the step of calculating a new spark advance offset equal to an old spark advance offset plus a predetermined closed spark value if the acceleration error is not greater than the predetermined deadband.

8. A method as set forth in claim 7 including the step of comparing the new spark advance offset to a predetermined value spark offset limit, and if the new spark advance offset is not greater than the spark offset limit, reducing the spark advance by the spark advance offset.

9. A method as set forth in claim 8 including the step of increasing the spark advance by a predetermined spark buffer value and closing the AIS stepper motor one step if the new spark advance offset is greater than the spark offset limit.

10. A method as set forth in claim 5 including the step of clearing the accumulated acceleration error, and if the acceleration error is greater than the predetermined deadband, setting the delta motor position equal to a function of the acceleration error and opening the AIS stepper motor said delta motor position.

11. A method as set forth in claim 10 including the step of calculating a new spark advance offset equal to an old spark advance offset plus an open spark value if the acceleration error is not greater than the predetermined deadband.

12. A method as set forth in claim 11 including the step of comparing the new spark advance offset to a predetermined value spark offset limit, and if the spark advance offset is not greater than the spark offset limit, increasing the spark advance by the spark advance offset.

13. A method as set forth in claim 12 including the step of reducing the spark advance by a predetermined spark buffer value and opening the AIS stepper motor one step if the spark advance offset is greater than the spark offset limit.

14. A method of controlling idle speed of an internal combustion engine in an automotive vehicle, said method comprising the steps of:

calculating an acceleration error of the engine;

determining whether the calculated acceleration error is greater than a predetermined deadband;

if the acceleration error is greater than the predetermined deadband, setting the acceleration error equal to a delta motor position and either opening or closing an AIS stepper motor said delta motor position;

calculating a new spark advance offset equal to an old spark advance offset plus a predetermined value if the acceleration error is not greater than the predetermined deadband;

comparing the new spark advance offset to a predetermined value spark offset limit, and if the spark advance offset is not greater than the spark offset limit, either reducing or increasing the spark advance by the spark advance offset; and reducing or increasing the spark advance by a predetermined spark buffer value and opening or closing the AIS stepper motor one step if the spark advance offset is greater that the spark offset limit.

15. A method as set forth in claim 14 wherein said step of calculating comprises:

calculating a RPM error equal to the sensed engine speed minus a desired engine speed;

calculating an instantaneous acceleration equal to a change in sensed engine speed over an ignition period of the engine;

calculating a desired acceleration equal to a constant (K) times the calculated RPM error; and calculating an acceleration error equal to the calculated instantaneous acceleration minus the calculated desired acceleration.

16. A method as set forth in claim 15 including the step of calculating an accumulated acceleration error equal to a previous accumulated acceleration error plus the calculated acceleration error.

17. A method as set forth in claim 16 including the step of determining if the accumulated acceleration error is greater than a predetermined error limit, and if not, repeating said step of calculating RPM error, instantaneous acceleration, desired acceleration, acceleration error, and accumulated acceleration error.

18. A method as set forth in claim 17 including the step of determining whether the calculated acceleration error is greater than zero.

\* \* \* \* \*